United States Patent [19]

Fox

[11] 4,044,493
[45] Aug. 30, 1977

[54] CRAB TRAP

[76] Inventor: Sam Fox, 630 N. Pulaski St., Baltimore, Md. 21217

[21] Appl. No.: 679,466

[22] Filed: Apr. 22, 1976

[51] Int. Cl.$^2$ ............................................. A01K 69/10
[52] U.S. Cl. ..................................................... 43/105
[58] Field of Search .......................................... 43/105

[56] References Cited

U.S. PATENT DOCUMENTS

| 679,327 | 7/1901 | Newcorn | 43/105 |
|---|---|---|---|
| 1,383,992 | 7/1921 | Masek | 43/105 |
| 1,968,758 | 7/1934 | Gatch | 43/105 |

Primary Examiner—Louis G. Mancene
Assistant Examiner—Daniel J. Leach
Attorney, Agent, or Firm—Armstrong, Nikaido & Marmelstein

[57] ABSTRACT

A meshed crab trap device is provided which has an open state when a crab can enter the device and a closed state for entrapping the crab. The device includes a base member, side members and top member, which are each formed from a plurality of perpendicular wires. The side members are pivotally coupled to one side of the base member and the top member has a size and shape which is identical to the bottom member. A plurality of U-shaped support means couple the top member to the base member such that the top member is parallel to the base member. The distance between the top and bottom members is slightly less than the width of the side members such that when the crab trap is in a closed state, the side members are perpendicular to the top and bottom members and a closed cage is formed for entrapping a crab therein. The side members have a rectangular shape in which the ratio of width to length is about 3:5. This provides a profile which appears to entice crabs to enter the trap. In one embodiment, the U-shaped support means are permanently attached to the bottom member but are collapsible thereon. In this arrangement the trap is easy to transport because it is collapsible but there are not a lot of loose pieces and also it is easy to assemble. It also makes a smaller package when collapsed which results in a savings of packaging materials and space in shipments with a consequent reduction in shipping costs.

8 Claims, 8 Drawing Figures

CRAB TRAP

BACKGROUND OF THE INVENTION

1. Field of the Invention

This invention is related to a crab trap and more particularly to a crab trap which has a side profile conducive to crabs and which is easily carried in its collapsed state and easy to assemble.

2. Description of the Prior Art

Conventional prior art crab traps of the collapsible type comprise a square base member having square sides pivotally connected thereto. The size of the sides is the same as that of the base. A top member is used which is significantly larger than the bottom member. The top and bottom members are held parallel to each other by means of U-shaped support members. Because of the fact that the top member is larger than the base member, the side members are not in a vertical position when the trap is closed. Also, a space is formed between the side members near the top of the trap when the sides are in a closed position. This is caused by the fact that the side members are inclined due to the larger top member.

One of the disadvantages of prior art traps of the type described is that they are cumbersome to assemble because of the fact that the top and bottom members are of different size. Since the trap is generally assembled when the person using it is at the site of crabbing, ease of assembly is a significant factor.

Another disadvantage of crab traps of this type is that the profile of the sides is square. This type of profile does not appear to be as enticing to crabs as a profile which is rectangular.

SUMMARY OF THE INVENTION

It is the primary object of the present invention to provide a crab trap which is collapsible, easy to assemble and has a side profile which is enticing to crabs entering the trap.

It is another object of the present invention to provide a crab trap in which the side profile is rectangular.

It is still another object of the present invention to provide a crab trap which has support members for supporting the top of the trap which are permanently attached to the bottom of the trap but foldable relative to the bottom when the trap is in the collapsed state.

It is still a further object of the present invention to provide U-shaped support members wherein the arms of the U are near the center of the trap thereby allowing a crab to enter the trap at any point around the periphery of the trap.

The present invention is directed to a meshed crab trap device which has an open state during which a crab can enter the device and a closed state for entrapping the crab. Furthermore, the device can be collapsed so that it can be easily transported, and it is made to be easily assembled at the crabbing site. The device comprises a base member, side members and top member, which are each formed from a plurality of perpendicular wires. Each side member is pivotally coupled to one side of the base member and the top member has a size and shape which is approximately the same size and shape as the bottom members. A plurality of U-shaped support means couples the top member to the base member such that the top member is parallel to the base member. The distance between the top and bottom members is equal to the width of the side members such that when the crab trap is in a closed state, the side members are perpendicular to the top and bottom members and a closed cage is formed for entrapping a crab therein. The side members have a rectangular shape in which the ratio of width to length is about 3:5. This provides a profile which appears to entice crabs to enter the trap. In one embodiment, the U-shaped support means are permanently attached to the bottom member but are collapsible thereon. In this arrangement the trap is easy to transport because it is collapsible but there are not a lot of loose pieces and also it is easy to assemble.

DETAILED DESCRIPTION OF THE PREFERRED EMBODIMENTS

Figure 2:
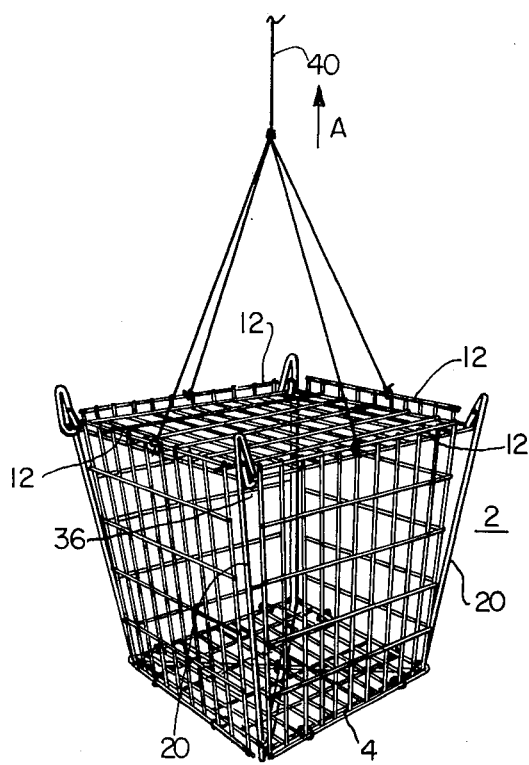
FIG. 2 is a perspective view of a prior art crab trap in a closed position.
Figure 3:
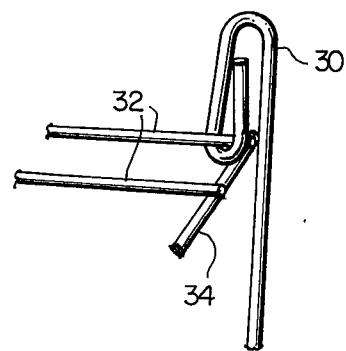
FIG. 3 is a perspective view illustrating the coupling of a top member to a support member in a prior art crab trap.
Figure 1:
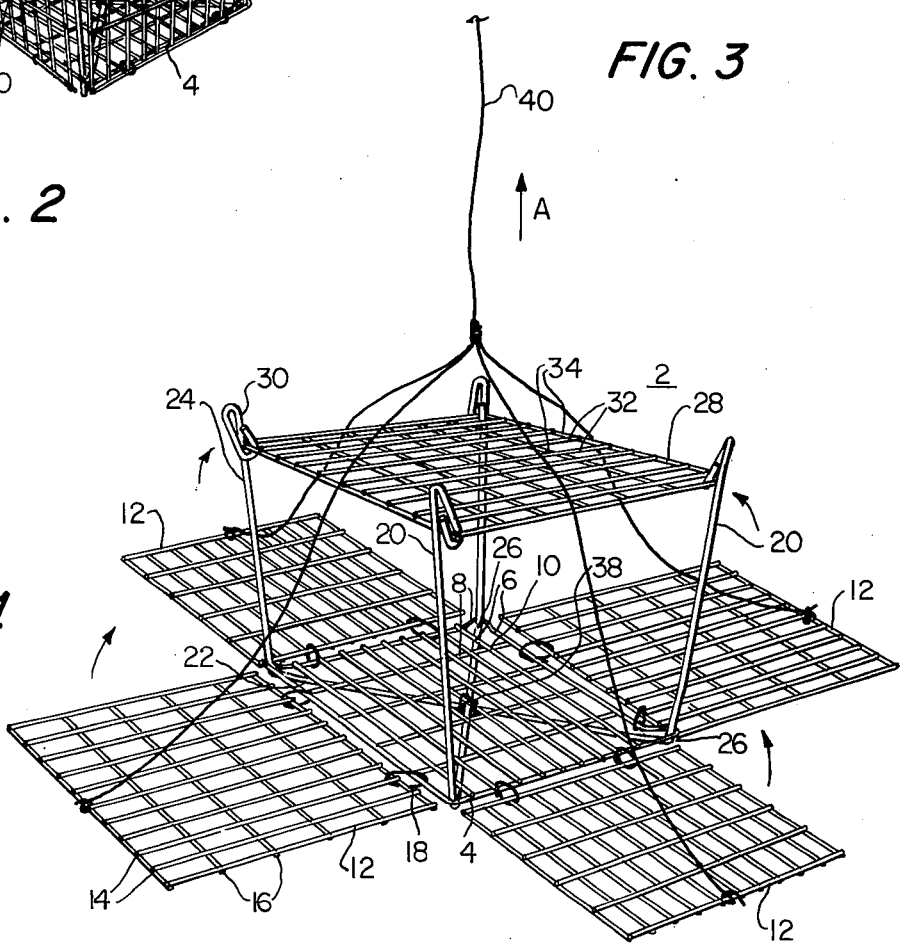
FIG. 1 is a perspective view of a prior art crab trap in an open position.

FIGS. 1, 2 and 3 show a prior art crab trap. FIG. 1 shows the crab trap in the open state while FIG. 2 shows it in the closed state. Referring to the figures, the crab trap 2 includes a bottom member 4 constructed of wires 6 and 8 which run perpendicular to each other. The wires are affixed to each other at points 10. This may be done, for example, by welding the wires together. The bottom member 4 is square, thus all of its sides are of equal length. Side members 12 comprise a mesh of wires 14 and 16 which are pivotally coupled to the bottom 4 by means of rings or hinges 18. Side members 12, like base 4, are square in shape with the length of the sides of side members 12 being equal to the length of the sides of the bottom member 4. U-shaped members 20 have a base 22 which is positioned beneath the bottom 4 and arms 24 which extend upward through the base 4 at corners 26. A top member 28 is engaged by loops 30 of the ends of arms 24. In this manner, top member 28 is positioned parallel to base 4. The top member 28 is formed by perpendicular wires 32 and 34. Top member 28 is square in shape, however, the sides of the square are larger than the side of base 4. Thus, arms 24 of the U-shaped members 20 form an angle with respect to the vertical.

Because the sides of side members 12 are the same size as the sides of base member 4, when the side members 12 are on the up position closing the trap as illustrated to FIG. 2, spaces 36 exist at the top of the trap. Also, it can be seen that the profile of the trap 2 when in the open position is a trapezoid with arms 24 being located at the corners of the periphery of the trap.

In operation, the trap is placed into the water in the open position illustrated in FIG. 1. Bait is placed on the bottom of the trap near center 38, and once a crab enters the trap to eat the bait, rope 40 is pulled in the direction of arrow A which causes the sides 12 to pivot about base member 4 until they are drawn into the up position illustrated in FIG. 2. This entraps the crab in the cage. The rope is then further pulled in direction A which will pull the trap out of the water.

Figure 7:
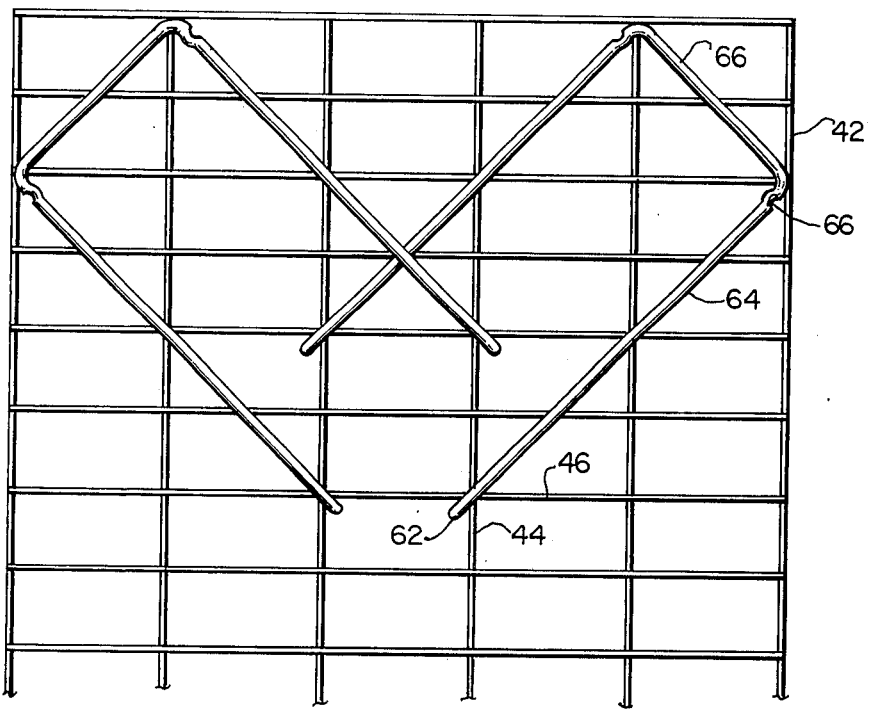
FIG. 7 is a plan view of a crab trap of the present invention in the collapsed state.

FIGS. 4-7 illustrate one embodiment of the present invention. In the embodiment shown in these figures, base 42 is a mesh formed by perpendicular wires 44 and 46. Base member 42 is square, thus sides 48 thereof are all of the same size. Side members 50 are pivotally connected to base member 42 by means of rings 52. The side members 50 are formed of a wire mesh similar to that of base 42. Side members 50 are rectangular in shape. The length 54 of the rectangle is equal to the length of side 48 of base 42. The width of the rectangle 56 is approximately 3/5 of the length 54. Top member 58 is positioned above and parallel to base member 42. The size and shape of top member 58 is approximately the same size and shape as base 42. The top member 58 is supported by means of two perpendicular U-shaped support members 60. Each of the support members 60 is coupled to the base 42 by means of loops 62 which are formed around an intersection of wires 44 and 46 of base 42. The loop is closed in order to permanently attach the U-shaped support members 60 to the base 42. However, because of the nature of the loop, the support members may be folded down as illustrated in FIG. 7 when the trap is in the collapsed state. By folding the support members 60 down, the bulkiness is substantially eliminated, thus facilitating the carrying of the trap. The arms 64 of the support members 60 have notches 66 formed therein at a point near the base 68 of the U. These notches engage the perpendicular wires 69 and 70 of the top member 58 at their intersection 72.

Figure 4:
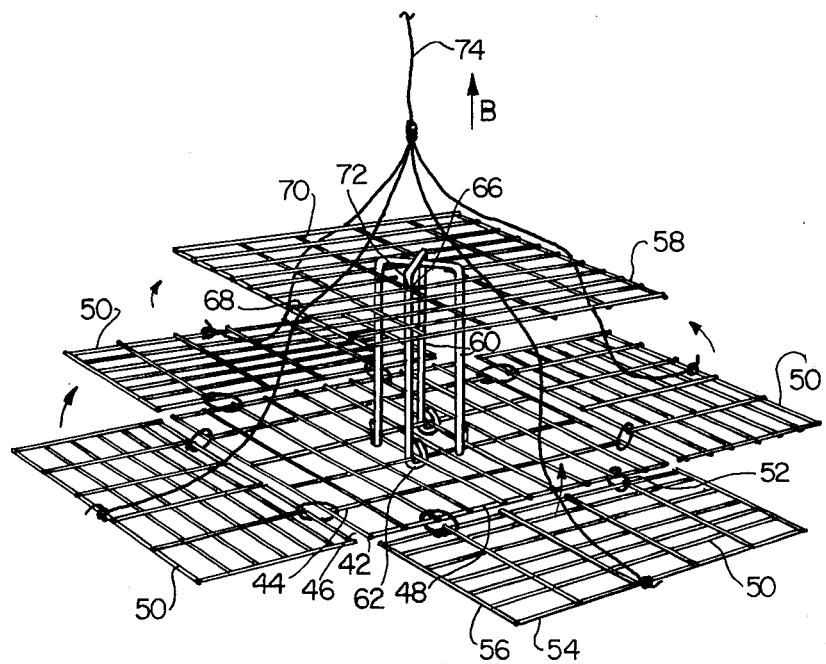
FIG. 4 is a perspective view of a crab trap of the present invention in the open state.
Figure 5:
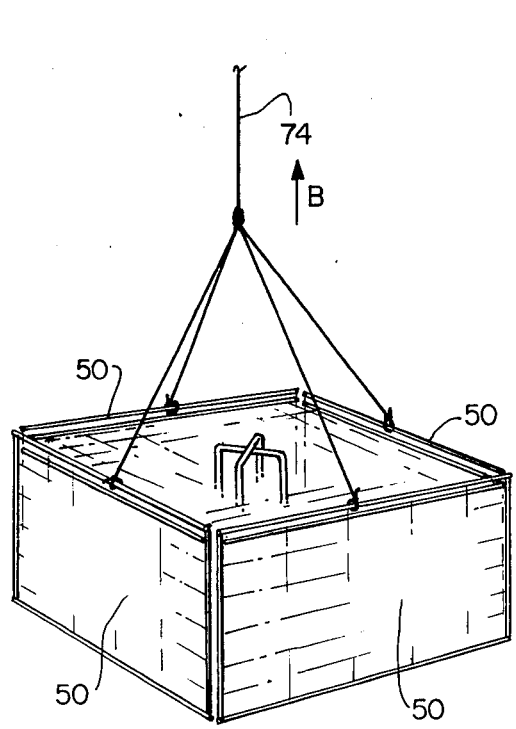
FIG. 5 is a perspective view of a crab trap of the present invention in the closed state.
Figure 6:
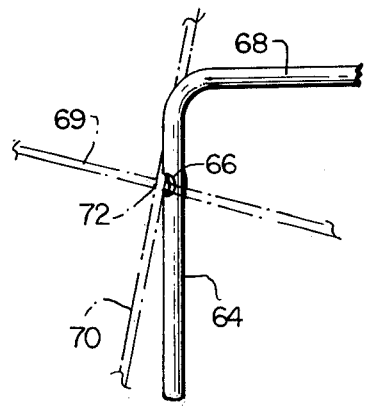
FIG. 6 is a perspective view showing the coupling of the top member and support members of a crab trap of the present invention.

The crab trap shown in FIGS. 4 and 5 does not have any obstructions around its periphery because the distance between the free ends of the arms of the U-shaped support members is considerably less than the length of the diagonal of the base 42. Furthermore, the trap presents a rectangular profile which appears to entice crabs to enter the trap. As can be seen in FIG. 5, when the trap is in the closed state, the side members 50 are perpendicular to base member 42 and top member 58. Thus, no significant space exists between the side members 50 near the top member 58. The crab trap is closed by pulling string 74 in the direction of arrow B.

Figure 8:
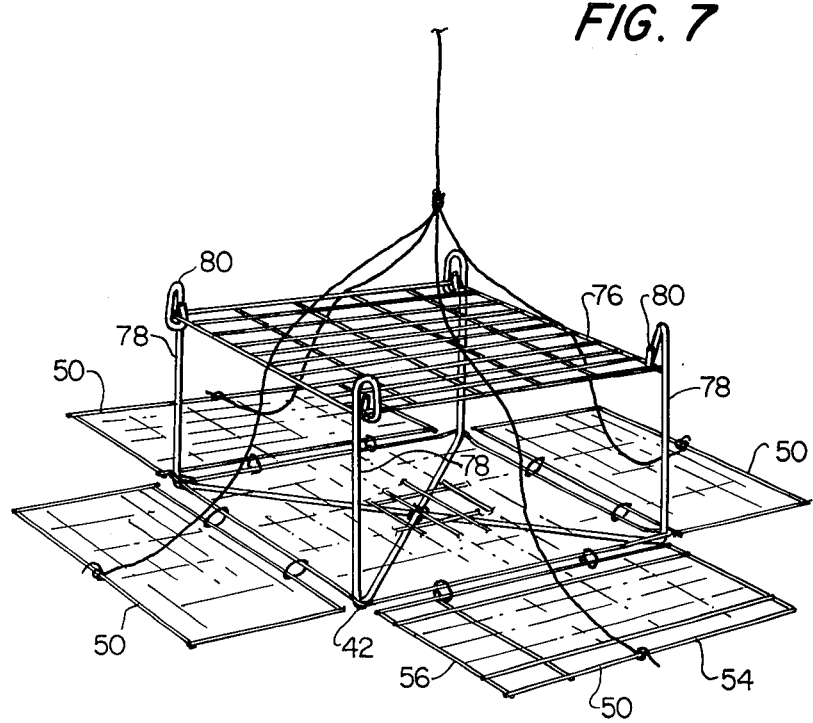
FIG. 8 is a perspective view of an alternate embodiment of a crab trap of the present invention in the open state.

FIG. 8 illustrates a second embodiment of the present invention. Base member 42 and side members 50 of the embodiment in FIG. 8 are the same as those in the embodiment of FIG. 4-7. The top member 76 differs from the top member 58 shown in the first embodiment in that it is not made to receive support members 60 such as those used in the embodiment of FIGS. 4-7. The size and shape of top member 76 is, however, approximately the same size and shape as base member 42. In the embodiment of FIG. 8, the top member 76 is coupled to the base member 42 by means of U-shaped support members 78. The support members 78 have arm portions which extend upwards through the base member 42 with top member 76 being coupled to the loop members 80 on the free ends of the arms of the U-shaped member 78. The arms of the U-shaped support members are vertical when the trap is assembled.

The side members 50 are rectangular in shape with the width 56 being about three-fifth of the length 54. The length 54 is the same as the length of the sides of base member 42.

The embodiment illustrated in FIG. 8 has a side profile which is enticing to crabs entering the trap. Furthermore, because the top member and bottom members are of the same size and shape, side members 50 will be perpendicular to each when the trap is in the closed position. This will eliminate undesirable spaces at the upper corners of the top member 76 which are found in prior art devices.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A meshed crab trap device having an open state when a crab can enter the device and a closed state for entrapping a crab in the device, said device comprising:
   a. a meshed base member comprising a first plurality of wires positioned parallel to each other and a second plurality of wires positioned at an angle with respect to said first plurality of wires and affixed thereto;
   b. a plurality of rectangular meshed side members having a width equal to approximately three-fifth of the length, each side member being pivotally coupled to one side of said base member wherein each side member comprises a first plurality of wires positioned parallel to each other and a second plurality of wires positioned at an angle with respect to said first plurality of wires and affixed thereto;
   c. a meshed top member having a size and shape substantially identical to said bottom member, said top member comprising a first plurality of wires positioned parallel to each other and a second plurality of wires positioned at an angle with respect to said first plurality of wires and affixed thereto;
   d. a plurality of U-shaped support means coupling said top member to said base member such that said top member is parallel to said base member, the distance between said top and bottom members being equal to the width of said side members, wherein when said crab trap is in its closed state said side members are perpendicular to said top and bottom members.

2. The crab trap of claim 1, wherein said base member is a square and all of said side members are identical in size and shape, the length of said rectangular side members being equal to the length of the side of said square base member.

3. The crab trap of claim 1, wherein said U-shaped support means includes two U-shaped support members positioned at an angle with respect to each other, the base of each U being aligned with a diagonal of said base member.

4. The crab trap of claim 3, wherein the distance between the free ends of the arms of said U-shaped member is less than the length of the diagonal of said base member, the free ends of the arms of said U-shaped members including coupling means for coupling said U-shaped member to said base member and the arms of said U-shaped members including engaging means near the base of the U for engaging said top member.

5. The crab trap of claim 4, wherein said coupling means comprises a closed loop bent around at least one of the wires of said base member.

6. The crab trap of claim 4, wherein said engaging means comprises a notch in each arm of the U-shaped member and wherein at least one wire of said top member is positioned in each said notch.

7. The crab trap of claim 4, wherein the base of the U-shaped support members extends along the diagonal of said base member and the arms thereof extend upward at the corners of said base member and wherein the free ends of said arms include coupling means for supporting said top member.

8. The crab trap of claim 7, wherein said coupling means includes an open loop for engaging the wires of said top member.

* * * * *